United States Patent [19]

Trimarchi

[11] Patent Number: 5,076,108

[45] Date of Patent: Dec. 31, 1991

[54] PROBE INSERTION APPARATUS WITH INFLATABLE SEAL

[75] Inventor: Paul A. Trimarchi, North Ridgeville, Ohio

[73] Assignee: The United States of America as represented by the Administrator of the National Aeronautics and Space Administrator, Washington, D.C.

[21] Appl. No.: 571,062

[22] Filed: Aug. 23, 1990

[51] Int. Cl.⁵ .............................................. G01M 19/00
[52] U.S. Cl. ...................................... 73/866.5; 277/34
[58] Field of Search ................... 73/866.5, 865.9, 147; 277/34.3, 34.6, 34

[56] References Cited

U.S. PATENT DOCUMENTS

| | | | |
|---|---|---|---|
| 3,007,340 | 11/1961 | Kraftson | 73/866.5 |
| 4,089,337 | 5/1978 | Kronner | 128/348 |
| 4,191,383 | 3/1980 | Baker et al. | 273/34.6 X |
| 4,253,676 | 3/1981 | Baker et al. | 277/34.6 |
| 4,305,591 | 12/1981 | deSivry et al. | 277/34 |
| 4,345,735 | 8/1982 | Regan | 277/34.3 X |
| 4,498,834 | 2/1985 | Christiansen | 414/291 |
| 4,505,205 | 3/1985 | Huang et al. | 104/139 |
| 4,505,483 | 3/1985 | Bent, Jr. | 277/34 |

FOREIGN PATENT DOCUMENTS

| | | | |
|---|---|---|---|
| 266847 | 4/1989 | Fed. Rep. of Germany | 73/866.5 |
| 75618 | 6/1980 | Japan | 73/866.5 |
| 166543 | 10/1982 | Japan | 73/866.5 |

*Primary Examiner*—Tom Noland
*Attorney, Agent, or Firm*—Kent N. Stone; John R. Manning; Gene E. Shook

[57] ABSTRACT

A sealing apparatus for inserting a probe into a pressure vessel having an elongated opening includes a pair of resiliently deformable seals opposingly disposed in sealing engagement with each other. A retainer is connected to the pressure vessel around the elongated opening and holds the pair of seals rigidly to the pressure vessel. A wedge is engageable with the pair of seals and carries the probe, for longitudinally translating the probe in the pressure vessel.

14 Claims, 3 Drawing Sheets 5,076,108

PROBE INSERTION APPARATUS WITH INFLATABLE SEAL

ORIGIN OF THE INVENTION

The invention described herein was made by an employee of the United States Government and may be manufactured and used by or for the government for governmental purposes without payment of any royalties thereon or therefore.

BACKGROUND OF THE INVENTION

1. Field of the Invention

The present invention relates generally to a probe insertion apparatus and, more specifically, to one which employs an inflatable seal as a barrier surface between two chambers of differing pressures.

2. Description of the Related Art

During testing, a wind tunnel has an internal pressure different from that of the external pressure. In order to facilitate insertion of a probe into the wind tunnel, and movement of the probe within the wind tunnel after insertion, a seal must be provided at an opening in the wind tunnel so as to maintain the internal pressure.

It is known to provide a wind tunnel with a lengthwise slot and a sliding face plate which covers the slot. For a two foot long slot, the conventional sliding face plate arrangement requires about six feet in total length, since the face plate must be four feet long to keep the slot covered through full probe travel along the length of the two foot slot. Full probe travel leaves up to two feet of overhang of the face plate on either side of the slot at any time. O-rings are provided between the sliding face plate and the outer wall of the wind tunnel to maintain pressure integrity.

As an alternative to the sliding face plate, all actuation hardware can be located inside a pressure-tight check or bubble extension of the pressure vessel and, while this method is suitable for situations where linear traverse is the only desired probe motion, it is much less practical when other combinations of probe motion are desired, such as, radial or rotary motion through the tunnel wall. It is much less practical in these cases because of the large additional volume required.

SUMMARY OF THE INVENTION

An object of the present invention is to provide a seal capable of maintaining pressure integrity of a pressure vessel while inserting and moving a probe therethrough.

Another object of the present invention is to provide an apparatus for inserting a probe into a pressure vessel which requires relatively little space.

Another object of the present invention is to provide an apparatus for inserting a probe into a pressure vessel which is relatively simple in construction and cost effective to produce.

These and other features and advantages of the present invention are met by providing a sealing apparatus for inserting a probe into a pressure vessel having an elongated opening, including a pair of resiliently deformable seals opposingly disposed in sealing engagement with each other, retainer means connected to the pressure vessel around the elongated opening for holding the pair of seals rigidly to the pressure vessel, and slider means engageable with the pair of seals and carrying the probe, for longitudinally translating the probe in the pressure vessel.

Preferably, the slider means is a double-ended wedge symmetrically shaped about a longitudinal axis and being sharply pointed at the opposite ends. A medial portion thereof carries the probe, either fixedly or slidably by means of a central, transverse bore.

These and other features and advantages of the sealing apparatus for inserting a probe into a pressure vessel according to the present invention will become more apparent with reference to following detailed description and drawings.

DETAILED DESCRIPTION OF THE PREFERRED EMBODIMENTS

Figure 1:
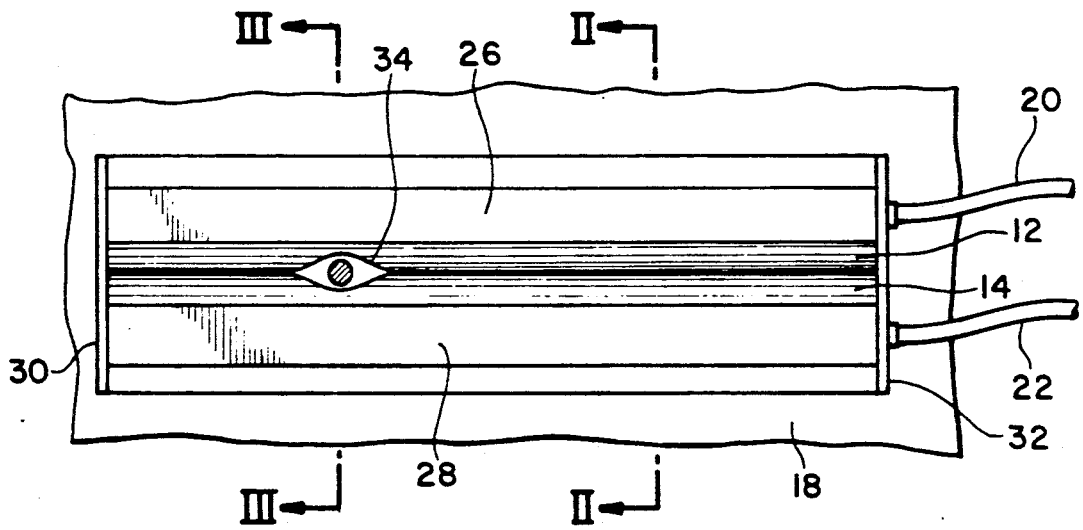
FIG. 1 is a top plan view showing a basic component of the sealing apparatus according to the present invention.
Figure 2:
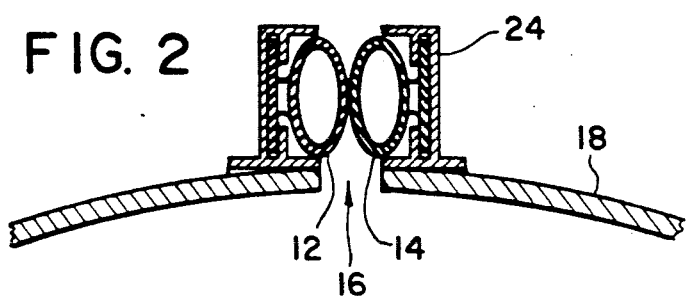
FIG. 2 is an enlarged vertical sectional view taken along line II—II of FIG. 1.

Referring now to FIGS. 1-4, a sealing apparatus for inserting a probe into a pressure vessel, such as a wind tunnel, through an elongated opening thereof is generally referred to by the numeral 16. The apparatus includes a pair of resiliently deformable seals 12 and 14 opposingly disposed in sealing engagement with each other over the elongated opening 16 provided in a sidewall 18 of the pressure vessel. The seals are preferably inflatable through connectors 20 and 22 to a pressure which exceeds the internal and external pressure of the pressure vessel. For example, if the pressure within a wind tunnel is 30 psi, the seals 12 and 14 would be inflated to about 50 psi. The connectors connect to a pressurized source for supplying air, or other fluid, to the seals.

The seals 12 and 14 are carried by a retainer 24 which includes two longitudinal U-shaped sections 26 and 28 interconnected through end plates 30 and 32. The retainer 24 is connected to the sidewall 18 of the pressure vessel by any suitable means, such as welding or by using threaded fasteners The retainer thus holds the pair of seals rigidly to the pressure vessel.

Figure 3:
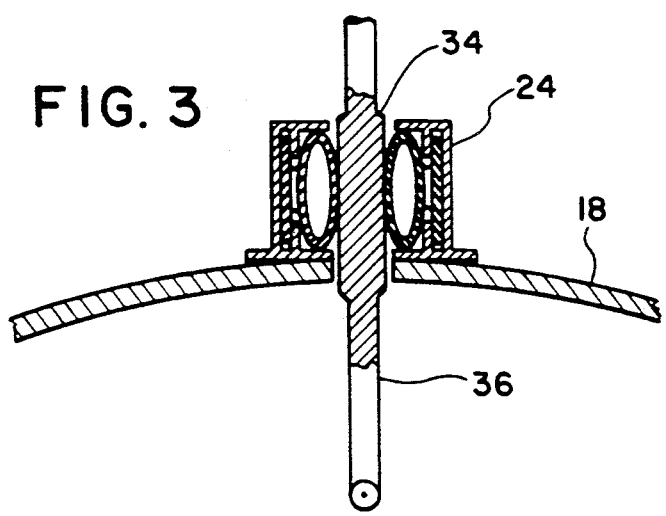
FIG. 3 is an enlarged vertical sectional view taken along line III—III of FIG. 1.
Figure 4:
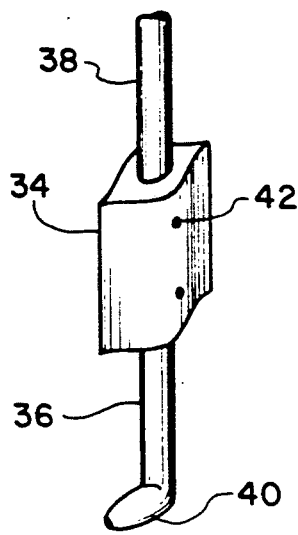
FIG. 4 is a perspective view of a probe and sliding wedge used in the FIG. 1 embodiment of the present invention.

A double-ended wedge 34 is longitudinally slidable between the two seals 12 and 14. The symmetrically curvilinear shape of the wedge 34, with pointed opposite axial ends facilitates a sealing engagement between the wedge and the seals so that the integrity of the pressure within the pressure vessel is maintained while the wedge 34 moves longitudinally between the two seals. As shown in FIG. 1, the seals 12 and 14 collapse around the wedge 34 so as to sealingly engage the wedge and prevent pressure equalization between the outside and the inside of the pressure vessel As shown in FIG. 3, the wedge 34 carries a probe 36 which extends into the pressure vessel from a bottom of the wedge 34. A shaft 38 which extends from the top of the wedge 34 can be connected to an actuator for moving the wedge longitudinally, thereby moving the probe longitudinally within the pressure vessel. The wedge 34 and shaft 38, as well as the probe 36, may be hollow or may otherwise be provided with an internal passageway to receive wiring from a distal, sensing end 40 of the probe 36.

An important aspect of the present invention is that the wedge 34 has a specifically designed cross-sectional shape which provides a gentle transition to enable the seals to conform to the outer surface of the wedge without leakage. This allows active positioning of the probe 38 within the pressure vessel without compromising the internal pressure. Probe actuation forces are very low, even though the seals remain inflated during probe movement, as long as the wedge/seal interface is kept lubricated. The lubrication also serves to prevent seal damage. Lubrication may be effected by applying a lubricant to the interface periodically. However, to avoid frequent manual re-lubrication, a self-lubricating system can be employed to bleed silicone grease out of the wedge itself through openings 42, for example. These openings may be provided as outlets for a remotely located reservoir of lubricant (not shown).

Figure 5:
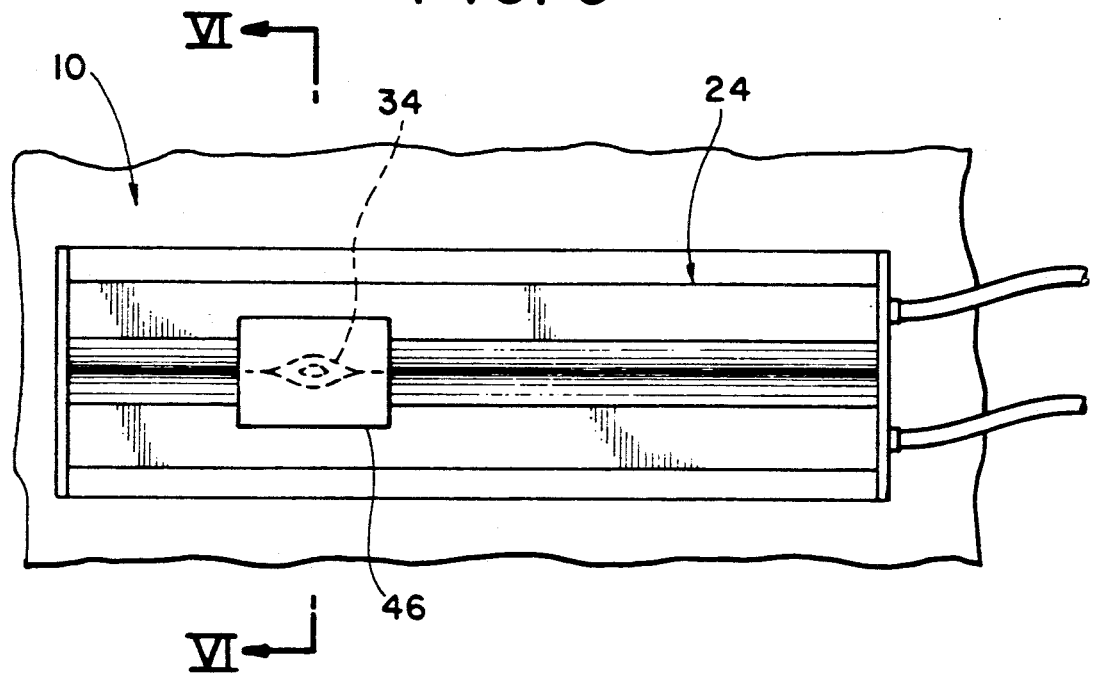
FIG. 5 is a top plan view of a second preferred embodiment of the present invention, showing the basic structure of a sealing apparatus.
Figure 6:
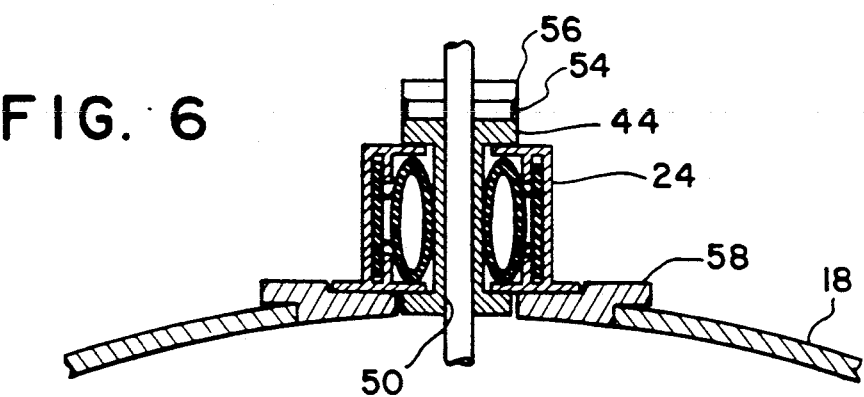
FIG. 6 is an enlarged, vertical sectional view taken along line VI—VI of FIG. 5.
Figure 7:
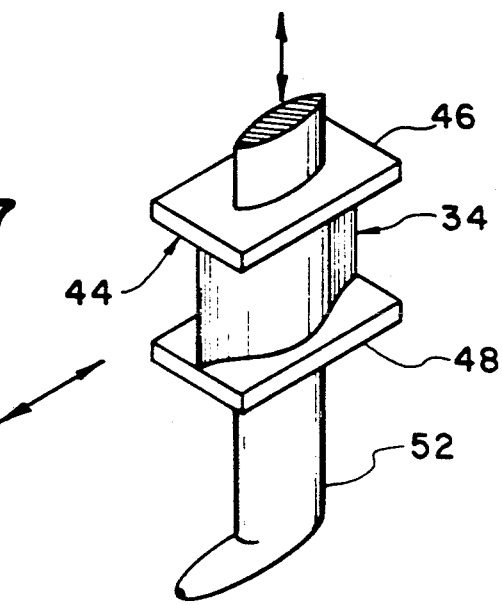
FIG. 7 is a perspective view showing the probe and wedge used in the embodiment of FIG. 5.

An alternative embodiment of the present invention is illustrated in FIGS. 5-7, in which the retainer 24 slidably carries the wedge 34, which is incorporated into a carriage 44 having an upper guide plate 46 and a lower guide plate 48 between which the wedge 34 is positioned.

In the embodiment of FIGS. 5-7, the carriage 44 is provided with a central bore 50 in which a probe 52 is slidably disposed. Thus, the probe 52 is longitudinally movable within the pressure vessel, and also transversely movable through the carriage, as indicated by the directional arrows in FIG. 7. A sheet of sealing material 54 is provided on top of the guide plate 46, and is sandwiched between the guide plate 46 and a retainer plate 56 so as to help prevent leakage of pressure through the bore 50.

As a slight modification, the embodiment of FIGS. 5-7 involves a wider elongated opening, into which a mounting plate 58 is secured by conventional means, such as welding, threaded fasteners, etc. Then, the retainer 24 is mounted on the mounting plate 58 also by using conventional fastening means. The mounting plate 58 has an elongated opening provided centrally therein, which corresponds to the opening 16 of the first embodiment.

Figure 8:
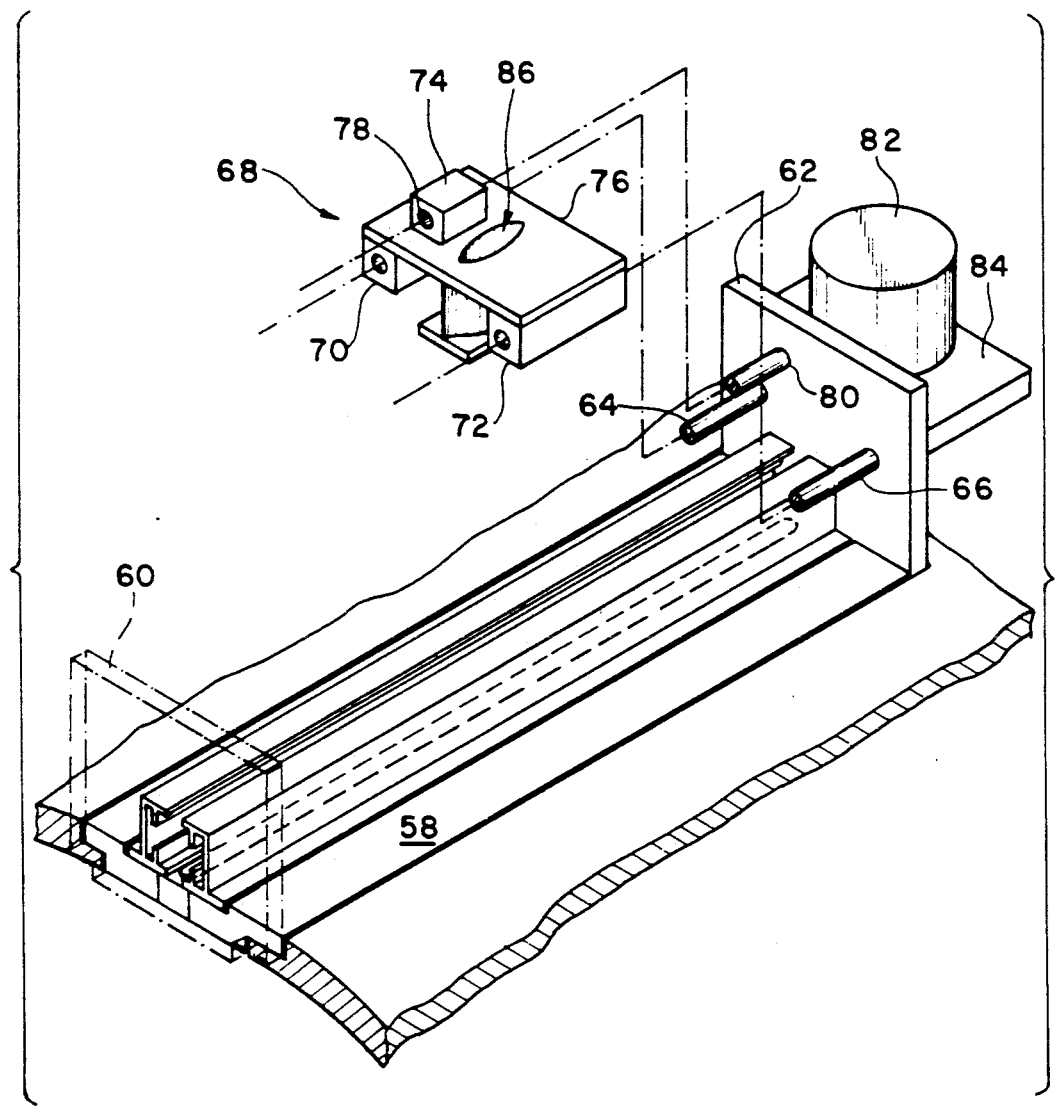
FIG. 8 is a perspective view, partially cut away, showing a preferred drive mechanism according to the present invention.

FIG. 8 illustrates a drive mechanism which is capable of moving the probe longitudinally along the length of the elongated opening. A pair of support plates 60 and 62 are rigidly connected to the mounting plate 58 at opposite axial ends thereof. A pair of guide rails 64 and 66 extend between the support plate 60 and 62 and provide guides for the carriage 68 which is provided with a pair of support blocks 70 and 72 in which the guide rails 64 and 66 are slidably mounted.

A ball nut 74 is mounted to the upper guide plate 76 of the carriage 68. The ball nut has a threaded bore 78 which threadedly engages a rotatable ball screw 80 which is journaled in the support plates 60 and 62 for rotation in either direction. Rotational movement is imparted in the ball screw by an electric drive motor 82 working through a gear box 84. Details of the gear box and drive motor, and their connections to the ball screw are not shown herein since they are all of conventional design and well known to those of ordinary skill in the art, as well as commercially available. When the ball screw 80 is caused to rotate by the drive motor 82 working through the gear box 84, the guide rails 64 and 66 prevent the carriage 68 from rotating with the ball screw 80. Therefore, the carriage 68 moves longitudinally along the guide rails 64 and 66 in either direction.

The carriage 68 also has a central bore 86 into which a probe is slidably mounted. The probe (not shown) can thus be moved transversely into and out of the pressure vessel, as well as axially along the length of the pressure vessel. Transverse movement of the probe can be done mechanically or manually simply by pushing the probe further into the pressure vessel.

The shape of the wedge 34 in all embodiments of the present invention is preferably smoothly curved and completely symmetric. The shape somewhat resembles a tear drop and is preferably curvilinear to provide a smooth transition between the pointed ends.

For high temperature applications, both an inlet and outlet line may be added to each seal to allow pressurized coolant to circulate, thereby maintaining seal temperature below the seals melting point.

Numerous modifications and adaptations of the present invention will be apparent to those so skilled in the art and thus, it is intended by the following claims to cover all such modifications and adaptations which fall within the true spirit and scope of the invention.

What is claimed is:

1. A sealing apparatus for inserting a probe into a pressure vessel having an elongated opening comprising
   a pair of resiliently deformable seals oppositely disposed in sealing engagement with each other,
   retainer means connected to the pressure vessel around the elongated opening for holding the pair of seals rigidly to the pressure vessel; and
   slider means engageable with the pair of seals and carrying the probe, for longitudinally translating the probe in the pressure vessel, said slider means comprising a double-ended wedge having a bottom, the probe extending into the pressure vessel from the bottom.

2. An apparatus according to claim 1, wherein the pair of seals are inflatable elastomeric seals.

3. An apparatus according to claim 2, wherein the retainer means comprises a seal retainer fixedly connected to and upstanding from an outer wall of the pressure vessel.

4. A sealing apparatus for inserting a probe into a pressure vessel having an elongated opening comprising:
   a pair of resiliently deformable seals oppositely disposed in sealing engagement with each other;
   retainer means connected to the pressure vessel around the elongated opening for holding the pair of seals rigidly to the pressure vessel; and
   slider means engageable with the pair of seals and carrying the probe for longitudinally translating the probe in the pressure vessel, said slider means comprising a double-ended wedge having a transverse bore, and wherein the probe is movable longitudinally with the wedge and transversely through the wedge.

5. An apparatus according to claim 4, wherein the wedge includes guide means, cooperating with the retainer means, for guiding the wedge in translatory movement between the pair of seals.

6. An apparatus according to claim 5, further comprising drive means, operatively coupled to the guide means, for moving the wedge between opposite axial ends of the pair of seals.

7. An apparatus according to claim 6, wherein the drive means comprises a ball nut and ball screw transmission driven by an electric motor, wherein the ball nut is fixedly connected to the guide means and threadedly engages the ball screw which is rotatably driven by the electric motor.

8. An apparatus according to claim 7, further comprising a pair of support rails for slidably supporting the guide means during movement of the wedge between opposite axial ends of the pair of seals.

9. A sealing apparatus for inserting a probe into a pressure vessel having an elongated opening comprising:
 a pair of resiliently deformable seals opposingly disposed in sealing engagement with each other in the elongated opening;
 a seal retainer having two opposite longitudinal side portions, each receiving one of the pair of resiliently deformable seals;
 a wedge slidably mounted on the seal retainer between the pair of seals, and having a bottom from which the probe extends into the pressure vessel; and
 means for driving the wedge longitudinally between opposite axial ends of the pair of seals.

10. An apparatus according to claim 9, wherein the wedge includes guide means, cooperating with the retainer means, for guiding the wedge in translatory movement between the pair of seals.

11. An apparatus according to claim 10, further comprising drive means, operatively coupled to the guide means, for moving the wedge between opposite axial ends of the pair of seals.

12. An apparatus according to claim 11, further comprising a pair of support rails for slidably supporting the guide means during movement of the wedge between opposite axial ends of the pair of seals.

13. An apparatus according to claim 9, wherein the resiliently deformable seals are pressurized with a circulating coolant.

14. An apparatus according to claim 13, wherein the drive means comprises a ball nut and ball screw transmission driven by an electric motor, wherein the ball nut is fixedly connected to the guide means and threadedly engages the ball screw which is rotatably driven by the electric motor.

* * * * *